UNITED STATES PATENT OFFICE.

HUGO GALLINOWSKY, OF NEWARK, NEW JERSEY.

ARTIFICIAL STONE.

SPECIFICATION forming part of Letters Patent No. 535,327, dated March 5, 1895.

Application filed May 19, 1892. Serial No. 433,610. (No specimens.)

*To all whom it may concern:*

Be it known that I, HUGO GALLINOWSKY, a citizen of the United States, residing at Newark, in the county of Essex and State of New Jersey, have invented certain new and useful Improvements in Artificial Stone; and I do hereby declare the following to be a full, clear, and exact description of the invention, such as will enable others skilled in the art to which it appertains to make and use the same.

The object of this invention is to provide, at a reduced cost an artificial stone capable of taking a high polish and having other qualifications of advantage in the architectural or industrial uses of the said stone.

My composition consists essentially in the following ingredients, to wit: calcined dolomite, hydrated oxide of aluminium, magnesium chloride, or in the matters resulting from the chemical union of said ingredients.

I proceed as follows to secure the desired composition: To, say, fifty pounds of a saturated solution of sulphate of aluminium, I add twenty-five pounds of a saturated solution of ammonium carbonate from which a precipitate of hydrated oxide of aluminium, $H_6Al_2O_6$, will be formed. The calcined dolomite, one hundred pounds, will contain, say, calcium oxide, fifty pounds, and magnesium oxide, fifty pounds, but these proportions vary in different dolomites. After pouring off the liquid from the precipitate above referred to, I add to the one hundred pounds of calcined dolomite (calcium oxide and magnesium oxide) fifty pounds of the above hydrated aluminium oxide and twenty pounds of magnesium chloride. I also prefer to add a small percentage of ammonium chloride to hasten the binding operation and secure the hardness common to double salt cementing. These ingredients are thoroughly mixed and after setting or hardening the artificial stone is ready for use.

I may color the stone by adding metallic oxides or other coloring matter suitable for the purpose and I may add suitable fillers, such as saw dust, wood pulp, hair, or other vegetable or animal fiber or tissue, sand, clay, slate or other stone dust, coal ashes, iron ore or other metallic ores, to secure desirable varieties of stone for special purposes.

Should the dolomite contain a higher percentage of calcium oxide than above stated, I then employ more of the hydrated oxide of aluminium and a smaller proportion of chloride of magnesium, but, on the other hand should the magnesium oxide be in greater proportion, then I employ a larger proportion of chloride of magnesium, the proportions being varied to suit the particular dolomite employed and the result desired.

In hardening the mixture, I may employ abnormal pressure such as that of a hydraulic press, or such pressure may be dispensed with.

What I claim as new is—

1. The herein described composition of matter to be used for artificial stone, comprising calcined dolomite, hydrated oxide of aluminium and magnesium chloride, substantially as set forth and in the proportions specified.

2. The herein described composition of matter to be used for artificial stone, composed of the following ingredients to wit: calcined dolomite, hydrated aluminium oxide, magnesium chloride and ammonium chloride, substantially as set forth and in the proportions specified.

In testimony that I claim the foregoing I have hereunto set my hand this 13th day of May, 1892.

HUGO GALLINOWSKY.

Witnesses:
CHARLES H. PELL,
OSCAR A. MICHEL.